United States Patent [19]
Saffold

[11] Patent Number: 6,139,080
[45] Date of Patent: Oct. 31, 2000

[54] REMOVABLE STORAGE APPARATUS FOR TRUCKS

[76] Inventor: David Johnston Saffold, 2225 Roanoke Rd., Clarksville, Tenn. 37043

[21] Appl. No.: 09/323,394

[22] Filed: Jun. 1, 1999

[51] Int. Cl.[7] ....................................... B60N 3/12
[52] U.S. Cl. ................. 296/37.6; 296/37.1; 292/145; 292/177
[58] Field of Search ................. 296/37.6, 37.1; 292/145, 146, 177

[56] References Cited

U.S. PATENT DOCUMENTS

| | | | |
|---|---|---|---|
| 1,646,136 | 10/1927 | Booth | 292/145 |
| 1,653,015 | 10/1927 | Koelln | 292/145 |
| 2,034,570 | 3/1936 | Flavin | 292/146 |
| 2,286,427 | 6/1942 | Levensten | 292/177 |
| 2,527,178 | 10/1950 | Elsaesser | 292/145 |
| 4,718,583 | 1/1988 | Mullican | 296/37.6 |
| 4,946,215 | 8/1990 | Taylor | 296/37.1 |
| 5,316,358 | 5/1994 | Payne et al. | 296/37.6 |
| 5,395,019 | 3/1995 | Christenden | 296/37.6 |
| 5,398,987 | 3/1995 | Sturgis | 296/37.6 |
| 5,564,776 | 10/1996 | Schlachter | 296/37.6 |
| 5,657,916 | 8/1997 | Tackett | 296/37.6 |
| 5,727,835 | 3/1998 | Krush et al. | 296/37.6 |
| 5,848,818 | 12/1998 | Flueckinger | 296/37.6 |
| 5,893,599 | 4/1999 | Strohfeldt | 296/37.6 |
| 5,924,616 | 9/1999 | Shives | 296/37.6 |
| 5,947,356 | 9/1999 | Delong | 296/37.6 |
| 6,007,128 | 12/1999 | Hines | 296/37.6 |

*Primary Examiner*—Joseph D. Pape
*Assistant Examiner*—Kiran Patel
*Attorney, Agent, or Firm*—David J. Saffold

[57] ABSTRACT

The present invention is a removable storage apparatus that is quickly and easily installed in and removed from the rear bed of trucks without the aid of tools or need to attach latching hardware to the truck. The removable storage apparatus includes a lid section connected to a container section for relative movement between an open and a closed position. The container section includes a latch portion integrally formed into the top wall of the container section and shaped to tightly fit into and mate with the inverse U-shaped inner surface of the top portion of the side walls of the truck when the latch portion is inserted therein. The removable storage apparatus further includes a latch member movably connected to the container section and manually movable between an engaged position wherein the latch member is engaged with a latch hole in the floor of the truck and an unengaged position wherein the latch member is unengaged with the latch hole in the floor of the truck. When the latch portion is properly mated with the top portion of the truck side wall and the latch member is in the engaged position, the removable storage apparatus is immovably latched to the rear bed of the truck and can only be removed by moving the latch member to the unengaged position when the lid section is in the open position.

5 Claims, 3 Drawing Sheets

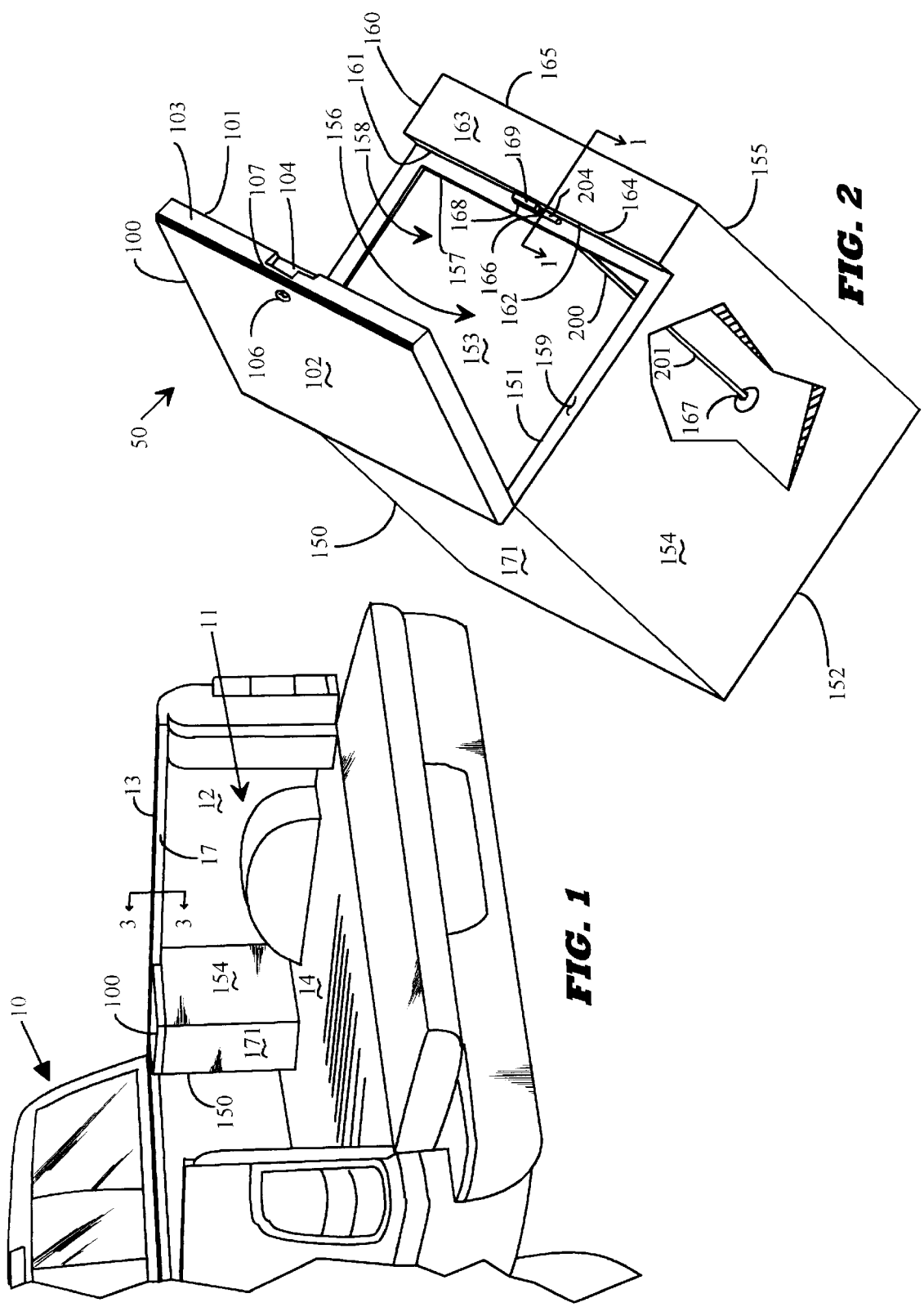

6,139,080

REMOVABLE STORAGE APPARATUS FOR TRUCKS

BACKGROUND OF THE INVENTION

The present invention relates to the field of storage devices for motor vehicles, and more particularly to storage devices for trucks.

Trucks of the type with rear bed cargo areas such as pickup trucks are especially susceptible to unwanted intrusion. These vehicles generally have no secure storage area that will keep cargo and personal effects out of sight and secure. Articles left unattended in the truck (especially articles stored in the rear bed of the truck) are view able by potential thieves and subject to theft and tampering. The theft of articles from these open vehicles is a major problem for owners. Moreso still, the threat of theft of articles is a major inconvenience to owners when shopping, traveling, or engaging in any other activity that involves transporting articles in the vehicle.

In the past, storage devices that create secure storage space in trucks have been devised to address the above described security problem. For the most part, these storage devices are relatively permanently installed (to prevent theft of the entire device and its contents) in the vehicle—usually by mounting the storage device to the rear bed of the truck with metal bolts or sheet metal screws. One consequence of permanently mounting the storage device in the rear bed of the truck is to reduce the effective cargo capacity of the truck and thus render the truck less useful for transporting cargo. Furthermore, if the owner needs to use the rear bed of the truck at its full size, the storage device must be removed from its relatively permanent attachment to the vehicle with tools, which is a time consuming and laborious operation for the owner.

Other storage devices require installing externally supplied latching hardware onto the truck chassis or the storage device itself in order to secure the storage device to the truck, which is relatively complicated and cumbersome for the truck owner. Furthermore, when latching hardware is mounted to the truck it can degrade the aesthetics of the truck as well as impede the loading and unloading of articles in the rear bed. One such device is depicted in U.S. Pat. No. 4,249,684 issued to Kenneth Miller. Miller's invention requires mounting properly spaced rails to the vehicle using sheet metal screws or welding. Another such device is depicted in U.S. Pat. No. 5,395,019 issued to David Christensen. Christensen's invention also requires the relatively permanent installation of a latching mount to the vehicle.

Furthermore, other storage devices require the manipulation of relatively complicated and cumbersome latching hardware in order to attach the storage device to the vehicle. An example of this type of device is depicted in U.S. Pat. No. 4,728,017 issued to Randall J. Mullican. Mullican's invention incorporates an externally mounted fixed jaw and a screw activated clamping jaw. The separated clamping device must be bolted to the storage container and the clamping jaw must be screwed by hand for the storage device to latch to the vehicle, which is a relatively arduous and time consuming process for the owner.

There is, therefore, a need in the industry for a device that addresses the problems outlined above as well as other related and unrelated problems.

BRIEF SUMMARY OF THE INVENTION

The present invention is a removable storage apparatus that is quickly and easily installed in and removed from trucks without the aid of tools. The removable storage device is useable in trucks with rear beds including an upstanding side wall with an inwardly projecting lip at the top portion thereof and a rear tied floor defining a hole therethrough to which, in conjunction with the inwardly projecting lip of the side wall, the removable storage apparatus removably latches to the rear bed of the truck as described below.

In accordance with the preferred embodiment of the present invention, the removable storage apparatus includes a lid section movably connected to a container section for relative movement between a closed position and an open position. The container section includes sides walls, a bottom wall, and a top wall together partially defining and interior storage compartment therein. The top wall defines an opening therein through which the interior storage compartment is accessible when the lid section is in the open position. The lid section includes a lock means for locking the lid section and the container section in the closed position. The top wall of the container section further includes a latch portion integrally formed therein with an inverse U-shaped top surface. The inverse U-shaped top surface of the latch portion is so shaped to tightly fit into and mate with the inwardly projecting lip of the side wall of the truck when the latch portion is inserted up and into the top portion of the side wall of the truck. The removable storage apparatus farther includes a latch member movably connected to the container section and movable between an engaged position wherein a latching end of the latch member is engaged with the hole in the floor of the rear bed of the truck and an unengaged position wherein the latching end is unengaged with the hole in the floor of the rear bed of the truck. The latch member includes a handle end for manually manipulating the latch member between the engaged and unengaged positions and is accessible to the outside only when the lid section is in the open position. When the latch portion is properly mated with the inwardly projecting lip of the side wall of the truck and the latch member is in the engaged position, the removable storage apparatus is tightly latched to the rear bed of the truck and can only be removed by moving the latch member to the unengaged position when the lid section is in the open position.

In accordance with the preferred embodiment of the present invention, the removable storage apparatus is removably manually installable in and removably manually extractable from the truck without requiring tools. Thus, the user is provided with a quick and easy means for securely storing articles in the rear bed of the truck.

It is therefor an object of the present invention to provide a secure storage means for trucks.

Another object of the present invention is to provide a storage apparatus that is quickly and easily installable into and quickly and easily removable from the rear bed of trucks.

Yet another object of the present invention is to provide a storage apparatus that is installable and removable from the rear bed of a truck without the aid or need for tools.

Yet another object of the present invention is to provide a storage apparatus that removably latches to the rear bed of a truck without the need for installing mating latching hardware onto the truck.

Other objects, features, and advantages of the present invention will become apparent upon reading and understanding this specification when taken in conjunction with the accompanying drawings.

BRIEF DESCRIPTION OF THE SEVERAL VIEWS OF THE DRAWING

FIG. 1 is a partial, rear, perspective view of a truck and a removable storage apparatus in accordance with the preferred embodiment of the present invention, wherein the removable storage apparatus is in an installed position in the rear bed of the truck.

FIG. 2 is an isolated, perspective view of the removable storage apparatus of FIG. 1 with the lid open.

DETAILED DESCRIPTION OF THE INVENTION

Figure 3:
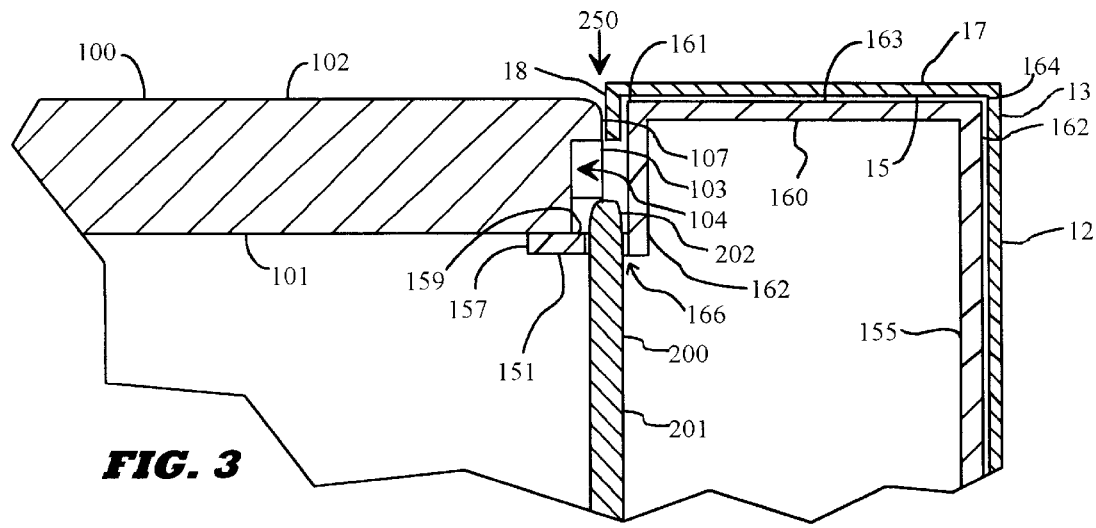
FIG. 3 is a cut-away, isolated, cross-sectional view along lines 1—1 of the upper portion of the removable storage apparatus of FIG. 2 with the lid closed.

Referring now to the drawings in which like numerals represent like components throughout the several views FIG. 1 is a partial, rear, perspective view of a truck 10 and a removable storage apparatus 50 in accordance with the preferred embodiment of the present invention, wherein the removable storage apparatus 50 is in an installed position in the truck 10. The truck 10 includes a rear bed 11 comprising in part an upwardly extending side wall 12 with a top portion 13 and a floor 14. The top portion 13 of the side wall 12 curls inward and down to form an inwardly projecting lip 17 with a substantially U-shaped inner surface 15 (see FIG. 3). Although the present invention is depicted usable in a conventional pickup truck, it is intended that the present invention is usable in any vehicle of similar structure including Sports Utility Vehicles.

Refer now to FIG. 2 which is an isolated, perspective view of the removable storage apparatus 50 in accordance with the preferred embodiment of the present invention. The removable storage apparatus 50 includes a lid section 100 connected to a container section 150 by a hinge means (not shown). The container section 150 includes a top wall 151, a bottom wall 152, right 154 and left 153 side walls, a rear wall 155 and a front wall 171 together partially defining an interior storage compartment 156. The top wall 151 includes an inner perimeter surface 157 defining an opening 158 for access to the interior storage compartment 156. The hinge means (not shown) can be any conventional hinge device that would be obvious to a person reasonably skilled in the art and functions to connect the lid section 100 to the container section 150 such that the lid section 100 and container section 150 are movable between a closed position wherein a bottom surface 101 of the lid section 100 is in contact with the top wall 151 of the container section 150 to substantially close off and render inaccessible the interior storage compartment 156 defined by the container section 150 and an open position (as shown in FIG. 2) wherein the interior storage compartment 156 is accessible.

The top wall 151 of the container section 150 includes a top surface 159 integrally forming an upwardly extending latch portion 160 extending between a rearward edge 161 of the top surface 159 and the rear wall 155 of the container section 150. The latch portion 160 includes a front latch wall 162 extending substantially upward from the rearward edge 161 of the top surface 159 and a top latch wall 163 extending between a top end 164 of the front latch wall 162 and a top end 165 of the rear wall 155 of the container section 150 such that the top surface 159 of the top wall 151 is substantially inverted U-shaped along the latch portion 160 of the container section 150. The latch portion 160 of the top surface 159 is shaped to mate with and snugly fit within the substantially inverted U-shaped inner surface 15 of the inwardly projecting lip 17 of the side wall 12 of the truck 10 when the latch portion 160 of the container section 150 is inserted into the inwardly projecting lip 17 of the top portion 13 of the side wall 12 of the truck 10.

Figure 4:
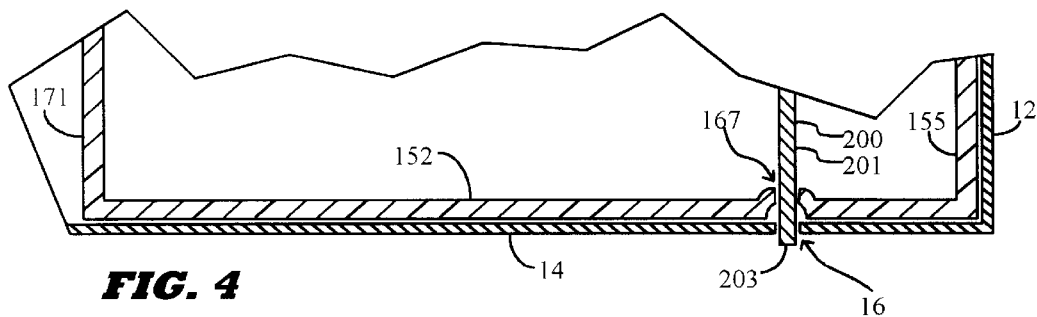
FIG. 4 is a cut-away, isolated, cross-sectional view along lines 1—1 of the lower portion of the removable storage apparatus of FIG. 2.
Figure 5:
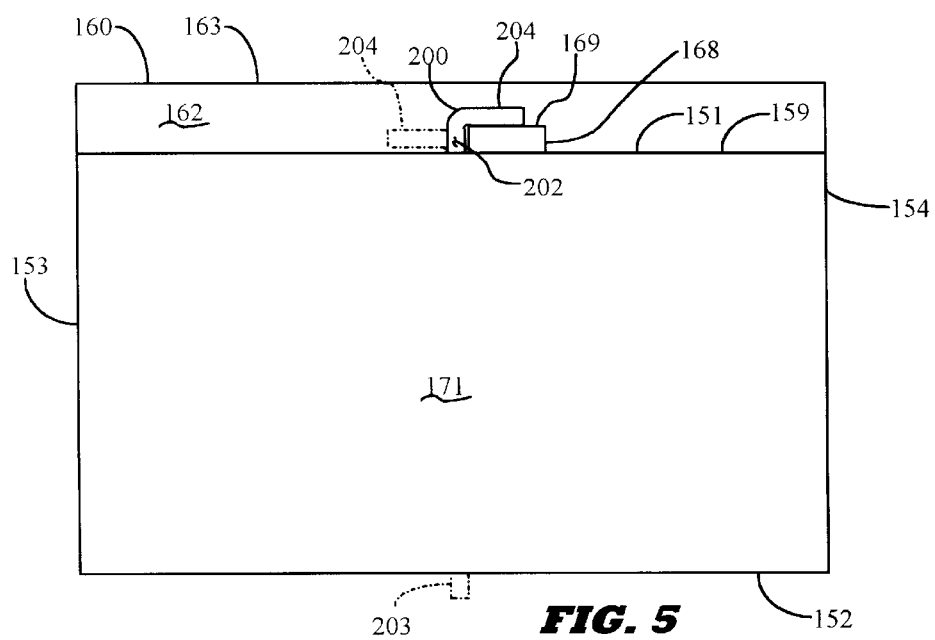
FIG. 5 is a front, elevation view of the removable storage apparatus of FIG. 2 with the lid removed.

The removable storage apparatus further includes a latch member 200 movably extending through a top latch hole 166 defined through the top wall 151 of the container section 150 and a bottom latch hole 167 defined through the bottom wall 152 of the container section 150. Referring also to FIGS. 3, 4, and 5, the latch member 200 includes a shaft 201 with a handle end 202 and a latching end 203. The handle end 202 of the latch member 200 extends above the top latch hole 166 and substantially 90 degrees to the shaft 201 to form a latch handle 204 for manually manipulating the latch member 200 between an engaged position wherein the latching end 203 extends through the bottom latch hole 167 and below the bottom wall 152 of the container section 150 and into a latch hole 16 defined in the floor 14 of the truck 10 and an unengaged position wherein the latching end 203 extends through the bottom latch hole 167 but not into the latch hole 16 in the floor 14 of the truck 10. The latch hole 16 defined in the floor 14 of the truck 10 is substantially vertically axially aligned with the shaft 201 of the latch member 200 and is shaped to allow only substantially vertical axial movement of the latching end 203 of the latch member 200 when the latch member 200 is in the engaged position. The container section 150 further includes a latch handle rest 168 extending upward from the top surface 159 of the top wall 151 and partially along the top surface 159 and away from the top latch hole 166 defined in the top wall 151 of the container section 150. The latch handle rest 168 includes a top surface 169 raised so above the top surface 159 of the top wall 151 of the container section 150 that when the latch handle 204 of the latch member 200 is placed thereon (as shown in FIG. 5) the latching end 203 of the latch member 200 is in the unengaged position and when the latch handle 204 of the latch member 200 is rotated substantially 180 degrees and lowered onto the top surface 159 of the top wall 151 of the container section 150 (as shown in FIG. 5 by dotted lines) the latching end 203 of the latch member 200 is in the engaged position.

The lid section 100 further includes a top surface 102, a bottom surface 101, and a rear side surface 103. The rear side surface 103 defines a latch recess 104 extending inward along a portion of and from the rear side surface 103 and upward from the bottom surface 101 of the lid section 100. The latch recess 104 is shaped to accept the latch handle 204 of the latch member 200 when the latch member 200 is in either the engaged position or the unengaged position when the lid section 100 is in the closed position as described above. When the lid section 100 is in the closed position, the latch handle 204 fits immovably into the latch recess 104 when the latch member 200 is in either of the engaged or unengaged position. Thus, the latching end 203 is locked into the engaged position with the floor 14 of the truck 10 when the latch member 200 is in the engaged position and the lid section 100 is in the closed position. Furthermore, the latch recess 104 extends partially upward from the bottom surface 101 of the lid section 100 so that a top portion 107 of the top surface 102 of the lid section 100 extends over the latch handle 204 preventing access to the latch handle 204 when the lid section 100 is in the closed position. The lid section 100 further includes a lock means 106 (see FIG. 2) which allows the user to exclusively lock the removable storage apparatus 50 in the closed position and unlock the removable storage apparatus 50 to the open position.

The top portion 107 of the rear side surface 103 of the lid section 100 and the front latch wall 162 of the latch portion 160 of the container section 150 partially define a gap 250 therebetween for accepting a downward portion 18 of the inwardly projecting lip 17 of the side wall 12 of the truck 10 when the storage apparatus 50 is properly installed in the truck 10. Thus, when the storage apparatus 50 is in the installed position and the lid section 100 is in the closed position, the downward portion 18 of the lip 17 substantially extends between the top portion 107 of the rear side surface 103 of the lid section 100 and the front latch wall 162 of the latch portion 160 of the top surface 159 of the container section 150 to further close off access to the latch member 200 therebelow.

Figure 6:
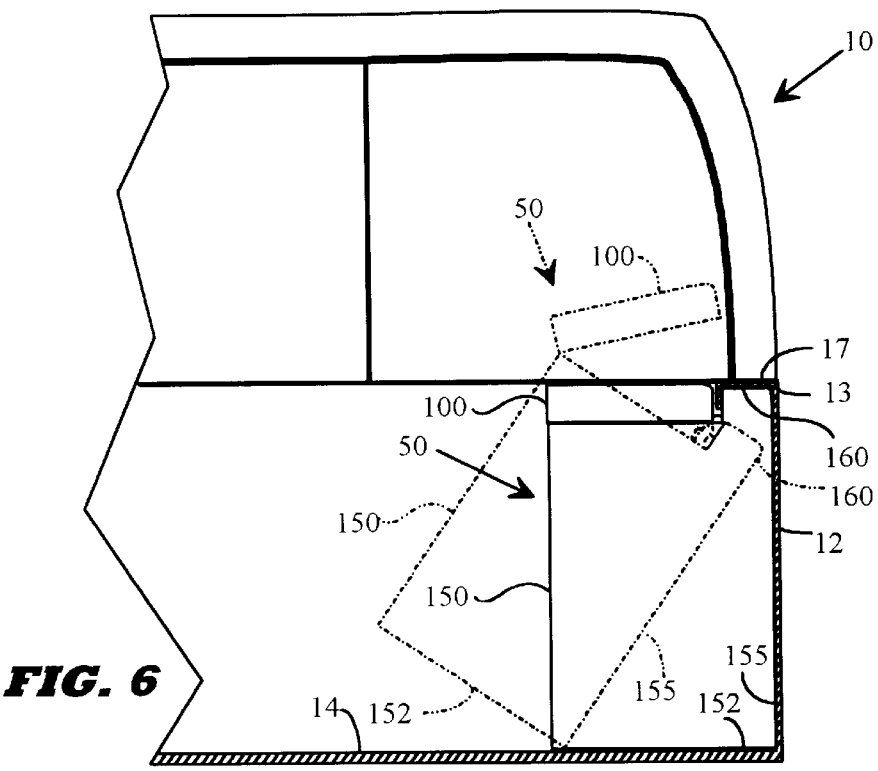
FIG. 6 is cut-away, cross-sectional view along lines 3—3 of the pickup truck and removable storage apparatus of FIG. 1, wherein the removable storage apparatus is shown in an intermediary position (broken lines) and an installed position (solid lines).

Referring now to FIG. 6, to properly install the removable storage apparatus 50 into the rear bed 11 of the truck 10 rotate the removable storage apparatus 50 to an intermediate position (shown in FIG. 6 by broken lines) wherein the latch portion 160 of the container section 150 is below and partially within the inwardly projecting lip 17 of the side wall 12 of the truck 10, the lid section 100 is in the open position, and the latch member 200 is in the unengaged position as described above. Next, rotate the removable storage apparatus 50 to the installed position (shown in solid lines) wherein the latch portion 160 of the container section 150 is firmly seated into the inwardly projecting lip 17 and the rear wall 155 and bottom wall 152 of the container section 150 are substantially parallel to and substantially against the side wall 12 and the floor 14 of the truck 10, respectively. When in the installed position as just described, the top 166 and bottom 167 latch holes of the container section 150 are substantially vertically axially aligned with the latch hole 16 in the floor 14 of the truck 10. Next, move the latch member 200 to the engaged position wherein the latching end 203 is engaged with the latch hole 16 in the floor 14 of the truck 10. Although in the preferred embodiment of the present invention the latch member 200 is moved to the engaged position by manual manipulation, it would be obvious to one skilled in the art to spring bias the latch member 200 to facilitate automatic engagement of the latch member 200 with the latch hole 16 in the floor 14 of the truck 10. Furthermore, it would be obvious to one skilled in the art to replace the latch hole 16 in the floor 14 of the truck 10 with a similarly functioning latching structure such as a tab, projection, depression, etc. that engages the latching end 203 of the latch member 200 to prevent, at least, inward movement (movement towards the center of the rear bed 11 of the truck 10) of the bottom wall 152 of the container section 150 when the removable storage apparatus 50 is in the installed position. The combination of the latch portion 160 of the container section 150 firmly seated into the inwardly projecting lip 17 of the top portion 13 of the side wall 12 of the truck 10 and the latch member 200 engaged with the floor 14 of the truck 10 when the removable storage apparatus 50 is in the installed position immovably latches the removable storage apparatus 50 to the truck 10. Thus, when the lid section 100 is locked in the closed position by the user, the removable storage apparatus 50 is removable from the truck 10 only by unlocking and moving the lid section 100 to the open position.

To remove the removable storage apparatus 50 from the truck 10, disengage the latching end 203 of the latch member 200 from the latch hole 16 in the floor 14 of the truck 10 by moving the lid section 100 to the open position and the latch member 200 to the unengaged position as described above. Next, rotate the bottom wall 152 of the container section 150 away from the side wall 12 of the truck 10 and lower the latch portion 160 of the container section 150 out of the lip 17 of the top portion 13 of the side wall 12 of the truck 10. The removable storage apparatus 50 can now be completely removed from the truck 30.

Figure 7:
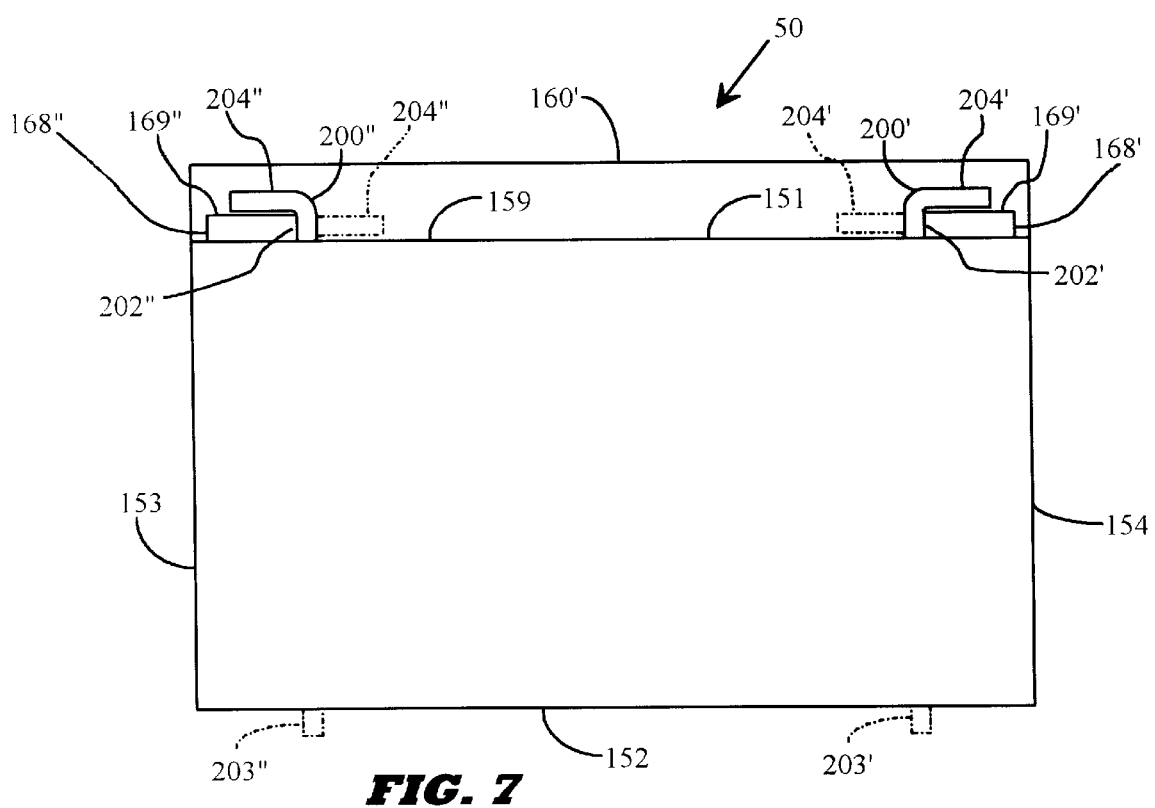
FIG. 7 is a front, elevation view of another embodiment of the removable storage apparatus of the present invention with the lid removed.

FIG. 7 is a front, elevation view of another embodiment of the removable storage apparatus of the present invention with the lid removed. This embodiment is substantially identical to the removable storage apparatus 50 of the preferred embodiment of the present invention except that an additional identical latch member and corresponding features are added. The removable storage apparatus 50' includes a first latch member 200' and a second latch member 200" each including a latch handle 204', 204" and latching ends 203',203", respectively. In accordance with this embodiment of the present invention, the container section 160' includes a first latch handle rest 168' and a second latch handle rest 168" each with top surfaces 169' and 169" respectively. The latch members 200', 200" extend through top and bottom latch holes (not shown) defined in the container section 160 and are movable between an engaged and unengaged position with corresponding latch holes (not shown) defined in the floor 14 of the truck 10. The first and second latch members 200', 200", first and second latch handle rests 168', 168", and top and bottom latch holes are positioned symmetrically about the vertical axis of the container section 160' and function similarly to latch member 200, latch handle rest 168, and top and bottom latch holes 166,167 of the removable storage apparatus 50 of the preferred embodiment of the present invention, respectively.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A manually installable and removable storage apparatus for a truck including a rear bed partially defined by a floor including a floor latch, and an upwardly extending side wall including an inwardly projecting lip portion, said removable storage apparatus comprising, in combination;

a container section including right and left side walls, front and rear side walls, a bottom wall, and a top wall defining an opening therein together partially defining an interior storage compartment, wherein said top wall includes a first surface extending between said front side wall and a rearward portion of said top wall and a second surface extending between said rearward portion of said top wall and said rear side wall, wherein said second surface of said top wall is so shaped that said second surface mates with the inwardly projecting lip portion of the side wall of the truck when said second surface of said top wall is inserted into the inwardly projecting lip portion of the side wall of the truck;

a lid section movably connected to said container section along adjoining edges thereof for relative movement between an open position wherein said interior storage compartment is accessible through said opening defined in said top wall of said container section and a closed position wherein said interior storage compartment is inaccessible;

a latch member movably connected to said container section and engageable with the floor latch of the floor of the truck, wherein said removable storage apparatus is immovably locked into the rear bed of the truck when said second surface of said top wall of said container section is inserted into the inwardly projecting lip portion of the side wall of the truck and said latch member is engaged with the floor latch of the floor of the truck.

2. The removable storage apparatus of claim 1, wherein said latch member includes a latching end and a handle end, wherein said latching end is movable between an engaged position wherein said latching end is engaged with the floor latch of the floor of the truck and an unengaged position wherein said latching end is unengaged with the floor latch of the floor of the truck by manually manipulating said handle end when said lid section is in the open position.

3. The removable storage apparatus of claim 1, wherein said top wall of said container section further defines a top latch hole and said bottom wall of said container section defines a bottom latch hole, wherein said latch member includes a shaft movably extending through said top and bottom latch holes, wherein said shaft includes a handle end extending above said top latch hole and a latching end extendable below said bottom latch hole and engageable with the floor latch of the floor of the truck by manually moving said latch handle when said lid section is in the open position.

4. The removable storage apparatus of claim 1, wherein the inwardly projecting lip portion of the top wall of the truck includes a substantially inverted U-shaped inner surface and said second surface of said container section extends above said first surface of said container section and is substantially inverted U-shaped.

5. A manually installable and removable storage apparatus for a truck including a rear bed partially defined by a floor defining a latch hole therethrough, and an upwardly extending side wall with a top portion curled inward and down to form an inwardly projecting lip portion with a substantially inverted U-shaped inner surface, said removable storage apparatus comprising, in combination;

a container section including right and left side walls, front and rear side walls, a bottom wall, and a top wall defining an opening therein together partially defining an interior storage compartment, wherein said top wall includes a first surface extending between said front side wall and a rearward portion of said top wall and a substantially inverted U-shaped second surface extending above said first surface and between said rearward portion of said top wall and said rear side wall, wherein said second surface of said top wall is so shaped that said second surface mates with the inwardly projecting lip portion of the side wall of the truck when said substantially inverted U-shaped second surface of said top wall is inserted into and against the substantially inverted U-shaped inner surface of the inwardly projecting lip portion of the side wall of the truck, wherein said top wall further includes a top latch hole and said bottom wall includes a bottom latch hole substantially vertically axially aligned with said top latch hole;

a lid section movably connected to said container section along adjoining edges thereof for relative movement between an open position wherein said interior storage compartment is accessible through said opening defined in said top wall of said container section and a closed position wherein said interior storage compartment is inaccessible;

a latch member including a shaft movably extending through said top and bottom latch holes in said container section, wherein said shaft includes a latching end extending below said bottom latch hole in said bottom wall and a handle end extending above said top latch hole in said top wall, wherein said latching end of said shaft is movable between an engaged position wherein said latching end is engaged with the latch hole in the floor of the truck and an unengaged position wherein said latching end is unengaged with the latch hole in the floor of the truck by manually manipulating said handle end when said lid section is in the open position;

wherein said removable storage apparatus is immovably latched to the rear bed of the truck when said second surface of said top wall of said container section is mated with the inwardly projecting lip portion of the side wall of the truck and said latch end of said shaft of said latch member is engaged with the latch hole defined in the floor of the truck.

* * * * *